No. 738,529. PATENTED SEPT. 8, 1903.
W. B. DEWEES.
BODY BRACE.
APPLICATION FILED MAR. 27, 1903.
NO MODEL. 3 SHEETS—SHEET 2.
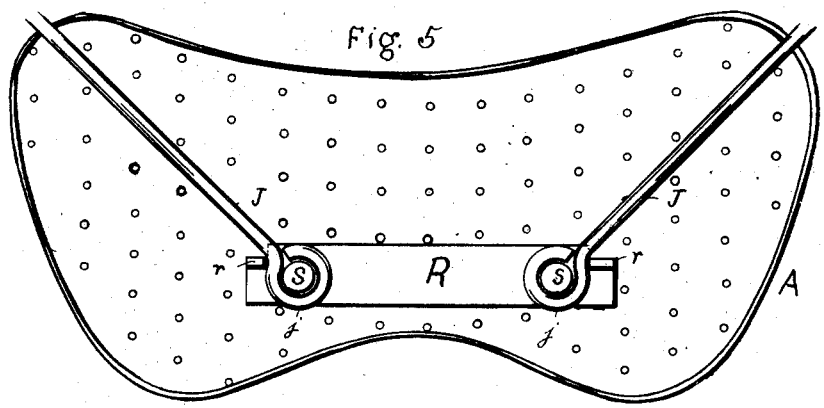
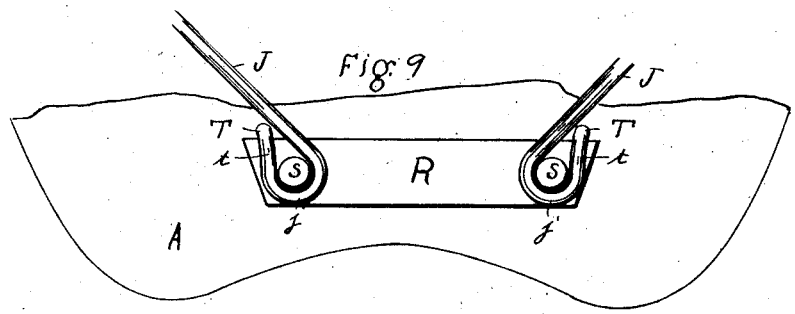

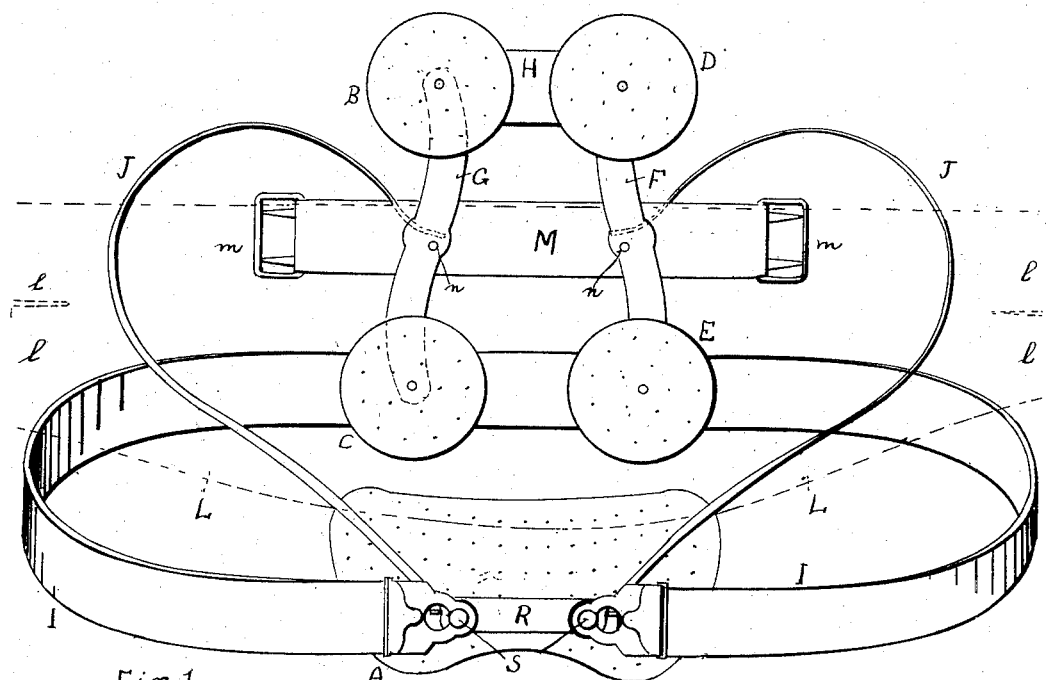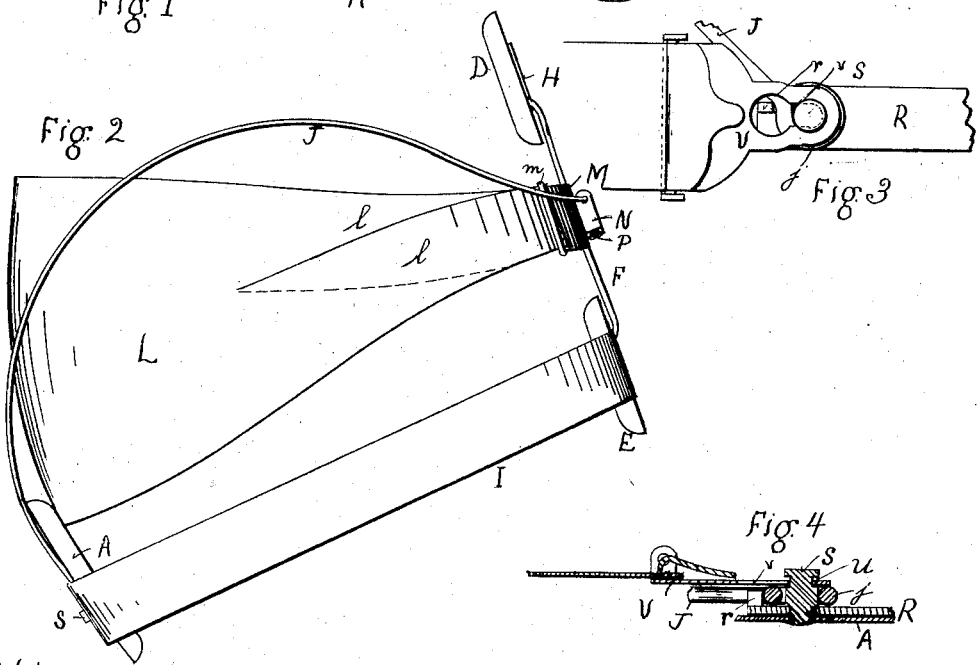

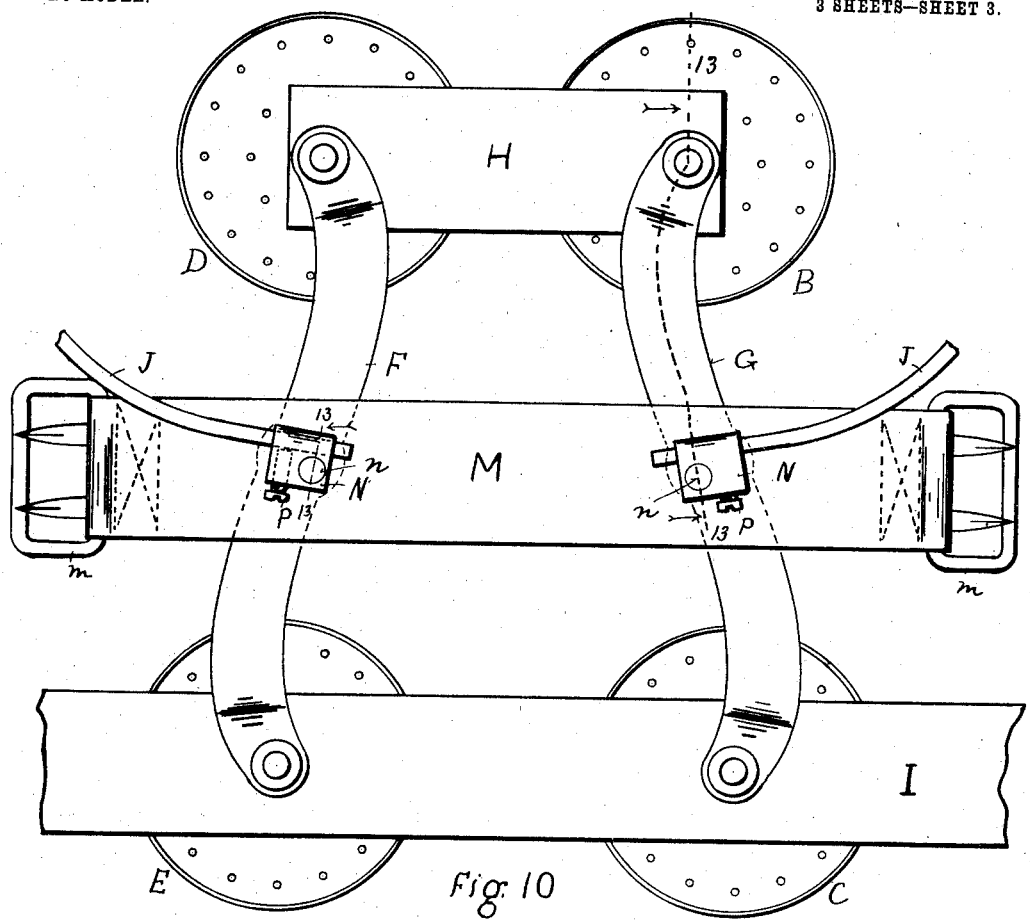

No. 738,529.  
Patented September 8, 1903.

UNITED STATES PATENT OFFICE.

WILLIAM B. DEWEES, OF SALINA, KANSAS.

BODY-BRACE.

SPECIFICATION forming part of Letters Patent No. 738,529, dated September 8, 1903.

Application filed March 27, 1903. Serial No. 149,877. (No model.)

*To all whom it may concern:*

Be it known that I, WILLIAM B. DEWEES, a citizen of the United States of America, residing at Salina, in the county of Saline and State of Kansas, have invented new and useful Improvements in Body-Braces, of which the following is a specification.

The invention relates more particularly to the style of body-braces or abdominal supports shown in United States Letters Patent Nos. 684,200 and 719,311, dated, respectively, October 8, 1901, and January 27, 1903, which cover inventions made by me.

The general object is to simplify and improve the construction and adaptation of such body-braces or abdominal supports.

Particular objects are as follows: To provide a means for detachably connecting the hip-bows and securing-straps to the front plate, so that the brace may be brought around from behind and fastened in front instead of in the rear, as heretofore with this class of braces; to provide an arrangement whereby a brace of this class may be applied without straining or bending the hip-bows; to so dispose the back pads and the connections of the hip-bows and securing-straps therewith that the pressure shall be equally distributed on those parts of the body best adapted to bear it; to flatten the attachments so they will not catch or tear the clothing of the wearer, and to provide an extra band adapted especially for persons having large abdomens, a feature, however from which all persons may obtain much comfort.

The invention consists of the novel combination, arrangement, and disposition of the parts, the preferred form of the embodiment whereof is herein described and claimed and is shown in the accompanying drawings, forming a part of this specification.

Figure 1 is a front view of the body-brace with a dotted outline of the extra band extended. Fig. 2 is a side view of the same complete as applied to the patient. Fig. 3 is a top view of the stud attachment, by which the hip-bow and securing-strap are detachably connected to the front pad. Fig. 4 is a central longitudinal section of the same through the line 4 4 of Fig. 3. Fig. 5 is a front view of the front plate, showing such attachments, the securing-strap being removed. Fig. 6 is a side view of one of such attachments. Fig. 7 is an end view of a modified form of such attachment. Fig. 8 is an end view thereof, and Fig. 9 is a top view of such modified form. Fig. 10 is a rear view of the back pads and connections. Fig. 11 is a section of the stud attachment through the line 11 11 of Fig. 12, which is a side view thereof. Fig. 13 is a longitudinal section of a part of the back pads and connecting-springs and attachment, as taken through the lines 13 13 of Fig. 10.

Like letters of reference indicate like parts throughout the several views.

A is the front pad. B C D E are the back pads arranged in pairs and connected by the substantially vertical springs F and G, respectively. I is the securing-strap. By securing-strap in this specification is meant the strap encircling the hips and connecting the front and back pads. J J are the hip-bows, also connecting the front and back pads. This much of the brace is not new, and I will now point out more particularly the new features.

On the front plate or pad A is a plate R, to which are attached the studs S S, one for each hip-bow and securing-strap. The front of the hip-bow terminates in a loop $j$, which is adapted to encircle the stud. A shoulder $r$ on the plate R is arranged to limit the outward movement of the hip-bow, but at the same time permit the inward movement of the bow so that the bow may easily conform to the movement of the body. Another form of a shoulder for the same purpose is shown in Figs. 7 and 9 and consists of the extreme tip T being bent inwardly so as to engage the side of the plate R, as shown. The stud S is grooved at U, and the end of the securing-strap I is provided with a buckle or plate V, which has a slot $v$, adapted to engage the groove U above the loop $j$, so as to hold the loop in engagement with the stud. In this connection it may be stated that the connections I, H, and M between the pairs of back pads are flexible—that is, they are of leather or web or elastic material or the like—so that the brace may be opened in front and bent in the rear without straining or bending the hip-bows.

The securing-strap I is connected to the lower pads of the pairs of back pads, while the upper pads are connected by the flexible strap H, and the respective hip-bows are connected centrally to the connecting-springs F and G. By this arrangement it is thought that a more equable distribution of the pressure on the back is acquired than with the arrangements heretofore used.

As will be noted by reference to Fig. 10, a separate hip-bow is provided on each side, each bow being connected centrally to its spring. This connection is made so as to be readily adjustable by means of the flattened stud N, which is riveted to the plate by the rivet or other means n through one corner of the stud. The hole O, to accommodate the bow J, is located along one side of the flat rectangular stud N and parallel to the plane of the back pads and the connecting-spring G (or F,) and a set-screw P is inserted also in a plane parallel to the plane of said back pads and connecting-springs and at substantially right angles to the hole O to secure the bow J. By this form of attachment I am able to avoid the use of the ordinary projecting stud or binding-post and avoid the catching or tearing of the wearer's clothes.

The final special feature of the invention consists of the extra band L, which is connected to the front pad A and adapted for use especially on persons having large abdomens. The strap M, connecting centrally the springs F and G, is provided with buckles m m. The ends of the extra band L are bifurcated l l l l, and in applying the brace to the patient the lower ends overlap the upper ends, as indicated in Fig. 2, the two ends being secured together in the buckle m. In order to readily and comfortably adjust the extra band L to the wearer, either end, the upper or the lower, may be drawn up so as to conform the band to the shape of the abdomen.

Before applying the brace the ends l l l l are disengaged from the buckles m m and the bow J and securing-strap I are disengaged from the stud S. To apply the brace, the patient may bring it around from the rear to its proper position, place the loop j down over the stud S and bring the slotted buckle or plate V into engagement with the groove U, thereby securing the brace firmly. The extra band L may then be buckled up to conform to the shape of the abdomen, as heretofore explained.

There may be variations from the exact description shown herein and in the drawings without departing from the spirit of the invention.

What I claim is—

1. In a body-brace a device for attaching the hip-bow to the pad consisting of a stud on the pad, a terminal loop of the bow adapted to encircle the stud, and a shoulder to limit the outward but permitting the inward movement of the bow.

2. In a body-brace a device for attaching the hip-bow to the pad consisting of a stud on the pad, a terminal loop of the bow adapted to encircle the stud, a shoulder adapted to limit the outward but permitting the inward movement of the hip-bow, and means for securing the loop on the stud.

3. The combination with the front and back pads, hip-bows, and securing-strap, connecting the front and back pads, of a device for detachably connecting the hip-bow and securing-strap to the front pad consisting of the grooved stud on the pad, the terminal loop of the bow adapted to encircle the stud, and a shoulder to limit the outward but permitting the inward movement of the hip-bow, the end of the securing-strap being slotted to engage the groove in the stud and hold the terminal loop in place thereon.

4. The combination with the front and back pads, hip-bows, and securing-strap connecting the front and back pads, of a device for detachably connecting the hip-bow and securing-strap to the front pad consisting of the stud on the pad, the terminal loop of the bow adapted to encircle the stud, the end of the securing-strap being adapted to engage the stud and hold the terminal loop in connection therewith.

5. The combination with the front pad, back pads arranged in pairs, the connecting-spring for each pair, the hip-bows connecting the front pad and centrally the connecting-springs respectively, and the securing-strap connecting the front pad and the lower pads of the pairs; of a device for detachably connecting the hip-bow to the front pad consisting of the grooved stud on the pad, the terminal loop of the bow adapted to encircle the stud, and the shoulder to limit the outward but permitting the inward movement of the bow, the end of the securing-strap being slotted to engage the groove and hold the loop in connection with the stud.

6. The combination with the front pad, the back pads arranged in substantially vertical pairs, the connecting-springs for each pair, the hip-bows connecting the front pad and centrally the connecting-springs respectively, the securing-strap connecting the front pad and the lower pads of said pairs, and a strap connecting the upper pads of said pairs at the back, the connections between the pairs at the back being flexible; of the device for detachably connecting the hip-bow and securing-strap to the front pad consisting of the grooved stud on the pad, the terminal loop of the bow to engage the stud, and the shoulder to limit the outward but permitting the inward movement of the bow, the end of the securing-strap being slotted to engage the groove and hold the terminal loop in place.

7. The combination of the front pad, the back pads arranged in pairs, a connecting-spring for each pair, hip-bows connecting the front pad and centrally the connecting-springs respectively, and the securing-strap connecting the front pad and the lower pads of said pairs.

8. The combination of the front pad, back pads arranged in substantially vertical pairs, connecting-springs for each pair, hip-bows connecting the front pad and centrally the connecting-springs respectively, the securing-strap connecting the front pad and the lower pads of the pairs and the strap connecting the upper pads of the pairs.

9. The combination of the front pad, back pads arranged in substantially vertical pairs, the connecting-spring for each pair, hip-bows connecting the front pad and centrally the connecting-springs respectively, the securing-strap connecting the front pad and the lower pads of said pairs, and a strap connecting the upper pads of the pairs; and a device for adjustably and detachably connecting the hip-bows to the connecting-springs consisting of a flat rectangular stud flatly and pivotally secured through one corner thereof to the connecting-spring, a hole therein at one side of the pivot and parallel to the plane of the pad to accommodate the hip-bow, and a set-screw in the stud at one side of the pivot parallel to the plane of the pad and at substantially right angles to the hole to secure the hip-bow.

10. In a body-brace a device for adjustably and detachably connecting the hip-bow to the pad consisting of the flat rectangular stud flatly secured through one corner thereof to the pad, a hole therein at one side of the pivot and parallel to the plane of the pad, for the hip-bow, and a set-screw in the stud at one side of the pivot, parallel to the plane of the pad and at right angles to said hole, to secure the hip-bow.

11. The combination of the front pad, back pads arranged in substantially vertical pairs, the connecting-spring for each pair, hip-bows connecting the front pad and centrally the connecting-springs respectively, the securing-strap connecting the front pad and the lower pads of the pairs, a strap connecting the upper pads of the pairs, the extra abdominal band attached to the front pad and having bifurcated ends and a strap connected centrally to the connecting-springs and having buckles to which to secure the overlapping bifurcated ends of the abdominal band.

12. The combination with the front and back pads and the hip-bows and securing-strap, of an extra abdominal band attached to the front pad having bifurcated ends, and a strap connected with the back pads and having buckles to secure the overlapping bifurcated ends of the extra band.

13. The combination with the front and back pads and the hip-bows of an abdominal support, of an extra abdominal band attached to the front pad and having bifurcated and overlapping ends, and means for securing said ends.

14. The combination with the front and back pads and the hip-bows and securing-strap of an abdominal support, of the extra abdominal band attached to the front and back pads.

15. The combination with the front and back pads and the hip-bows of an abdominal support, of the extra abdominal band attached to the front pad.

In testimony whereof I have affixed my signature in presence of two witnesses.

WILLIAM B. DEWEES.

Witnesses:
WM. GEO. DEWEES,
ALICE STERLING.